US008381306B2

(12) United States Patent
McPherson et al.

(10) Patent No.: US 8,381,306 B2
(45) Date of Patent: Feb. 19, 2013

(54) TRANSLATING ROLE-BASED ACCESS CONTROL POLICY TO RESOURCE AUTHORIZATION POLICY

(75) Inventors: Dave McPherson, Bothell, WA (US); Muthukrishnan Paramasivam, Seattle, WA (US); Paul J. Leach, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 11/443,638

(22) Filed: May 30, 2006

(65) Prior Publication Data

US 2007/0283443 A1 Dec. 6, 2007

(51) Int. Cl.
*G06F 21/00* (2006.01)
(52) U.S. Cl. .............................. 726/27; 726/26; 726/28
(58) Field of Classification Search .................... 726/26, 726/27
See application file for complete search history.

(56) References Cited

U.S. PATENT DOCUMENTS

| | | | | |
|---|---|---|---|---|
| 5,911,143 | A * | 6/1999 | Deinhart et al. | 707/103 R |
| 6,202,066 | B1 * | 3/2001 | Barkley et al. | 707/9 |
| 6,237,036 | B1 | 5/2001 | Ueno et al. | |
| 7,624,424 | B2 | 11/2009 | Morita et al. | |
| 7,647,256 | B2 * | 1/2010 | Burch et al. | 705/29 |
| 2002/0026592 | A1 | 2/2002 | Gavrila et al. | 726/6 |
| 2003/0229623 | A1 | 12/2003 | Chang et al. | |
| 2004/0083367 | A1 | 4/2004 | Garg et al. | |
| 2004/0225896 | A1 | 11/2004 | Ng | 726/6 |

FOREIGN PATENT DOCUMENTS

| | | |
|---|---|---|
| JP | 11-313102 A | 11/1999 |
| JP | 2006012117 A | 1/2006 |

OTHER PUBLICATIONS

McPherson, Dave . "Role-Based Access Control for Multi-tier Applications Using Authorization Manager." Microsoft Technet. Jul. 31, 2004. Microsoft. <http://technet.microsoft.com/en-us/library/cc780256(WS.10,printer).aspx>.*
Kumar , Satheesh. "Role based security using Authorization Manager in Windows Server 2003." C Sharp Corner. Jul. 10, 2006. <http://www.c-sharpcorner.com/UploadFile/nsatheeshk/AuthMan07062006054504AM/AuthMan.aspx>.*
Policht, Marcin. "Exploring Windows 2003 Security: Authorization Manager ." Server Watch. Dec. 9, 2003. Jul. 20, 2009 <http://www.serverwatch.com/tutorials/article.php/3287431>.*
"Group types: Active Directory." Microsoft Technet. Jan. 21, 2005. Microsoft TechNet. <http://technet.microsoft.com/en-us/library/cc781446(WS.10,printer).aspx>.*
D. Thomsen , D. O'Brien , J. Bogle, Role-Based Access Control Framework for Network Enterprises, Proceedings of the 14th Annual Computer Security Applications Conference, Dec. 7-11, 1998.*
D. J. Thomsen, Richard C. O'Brien and C. Payne, Napoleon: Network Application Policy Environment, ACM Workshop on Role-Based Access Control, 1999, pp. 145-152.*

(Continued)

*Primary Examiner* — Kambiz Zand
*Assistant Examiner* — Imhotep Durham
(74) *Attorney, Agent, or Firm* — Woodcock Washburn LLP

(57) ABSTRACT

Translation of role-based authoring models for managing RBAC "roles" to resource authorization policy (RAP), such as ACL-based applications, is provided. A generic RBAC system is defined from which mappings to other authorization enforcement mechanism make possible the translation of RBAC "roles" to resource authorization policies applied to resources managed by a resource manager, e.g., a file system resource manager. An implementation is described that uses Windows Authorization Manager as a storage mechanism and object model to manage object types and relationships translated from an RBAC system.

20 Claims, 8 Drawing Sheets

OTHER PUBLICATIONS

Barkely, John., "Comparing Simple role based access control models and access control lists," In: Proceedings of the Second ACM workshop on Role-based access control, 1997, 6 pages.

Stell et al., "Comparison of advanced authorization infrastructures for grid computing," $19^{th}$ International Symposium on High Performance Computing Systems and Applications, 2005, 195-201.

EP Application No. 07777246.5: Extended European Search Report, Jun. 29, 2010, 8 pages.

Jonsson, "Instance-Level Access Control in J2EE", Master's Degree Project, KTH Numerical Analysis and Computer Science, 2005, 59 pages.

Kosiyatrakul et al., "A Modal Logic for Role-Based Access Control", Computer Network Security, Third International Workshop on Mathematical Methods, Models, and Architectures for Computer Networked Security, MMM-ACNS Proceedings (Lecture Notes in Computer science vol. 3685) Springer-Verlag Berlin, Germany, 2005, 179-193.

Zhang et al., "PBDM: A Flexible Delegation Model in RBAC", SACMAT '03—Proceedings of the eighth ACM symposium on Access control models and technologies, Jun. 2-3, 2003, 10 pages.

* cited by examiner

TRANSLATING ROLE-BASED ACCESS CONTROL POLICY TO RESOURCE AUTHORIZATION POLICY

FIELD OF THE INVENTION

The present invention relates to translating role based access control (RBAC) policy to resource authorization policy.

BACKGROUND OF THE INVENTION

One of the most challenging problems in managing large networks results from the sheer complexity of security administration, making authorization an important issue in computer and network systems. In this regard, authorization mechanisms exist in operating systems, applications, or anywhere resource access control is concerned. Authorization is traditionally composed of two separate processes: authentication and access control. Authentication deals with the problem "who is the user?" and access control deals with the problem "what can the user do to/with a certain resource?"

At the resource level, historically, networks have used resource authorization policy (RAP) to decide whether a user is authorized to connect to a specified resource. For an exemplary RAP, traditional distributed computing networks have used domain based access control lists (ACL) as the dominant mechanism for access control. An ACL specifies access rights of users to the resources in terms of read, write or execute permissions in data structures, but inevitably brings manageability and complexity problems as the number of resources and users continue to proliferate to great numbers in today's shared computing spaces.

In contrast to conventional RAP methods of access control, which grant or revoke user access on a rigid, object-by-object basis, an alternative to RAP is role based access control (RBAC) policy, also called role based security. RBAC has become a prominent model for access control because it reduces the complexity and cost of security administration in large networked applications. RBAC is a method of regulating access to computer or network resources based on the roles of individual users within an enterprise. In this context, access is the ability of an individual user to perform a specific task, such as view, create, or modify a file. Roles are defined according to existing roles/labels within the enterprise, e.g., job competency, authority or responsibility.

When properly implemented, RBAC enables users to carry out a wide range of authorized tasks by dynamically regulating their actions according to flexible functions, relationships, and constraints. In RBAC, roles can be easily created, changed, or discontinued as the needs of the enterprise evolve, without having to individually update the privileges for every user.

RBAC thus enables activities that are difficult in distributed access control list (ACL) models on most computer systems. Such activities include authorization queries across applications. However, currently there is no way to translate role-based authoring models for managing RBAC "roles" to resource authorization policy (RAP), such as ACL-based applications, or other authorization enforcement mechanisms. As described in more detail below with respect to the various embodiments of the invention, it would be desirable to improve upon these and other deficiencies of the state of the art.

SUMMARY OF THE INVENTION

In view of the foregoing, the present invention provides systems and methods for translating role-based authoring models for managing RBAC "roles" to resource authorization policy (RAP), such as ACL-based applications, or other authorization enforcement mechanisms. The invention thus defines a generic RBAC system, from which mappings to other authorization enforcement mechanism make possible the translation of RBAC "roles" to resource authorization policies applied to resources managed by a resource manager (e.g., a file system resource manager). In an exemplary non-limiting embodiment, an implementation is discussed using Windows Authorization Manager as a storage mechanism and object model to manage object types and relationships translated from an RBAC system.

Other features of the present invention are described below.

BRIEF DESCRIPTION OF THE DRAWINGS

The methods for translating RBAC policy to RAP in a networked computing environment are further described with reference to the accompanying drawings in which.

DETAILED DESCRIPTION OF ILLUSTRATIVE EMBODIMENTS

Overview

Figure 1:
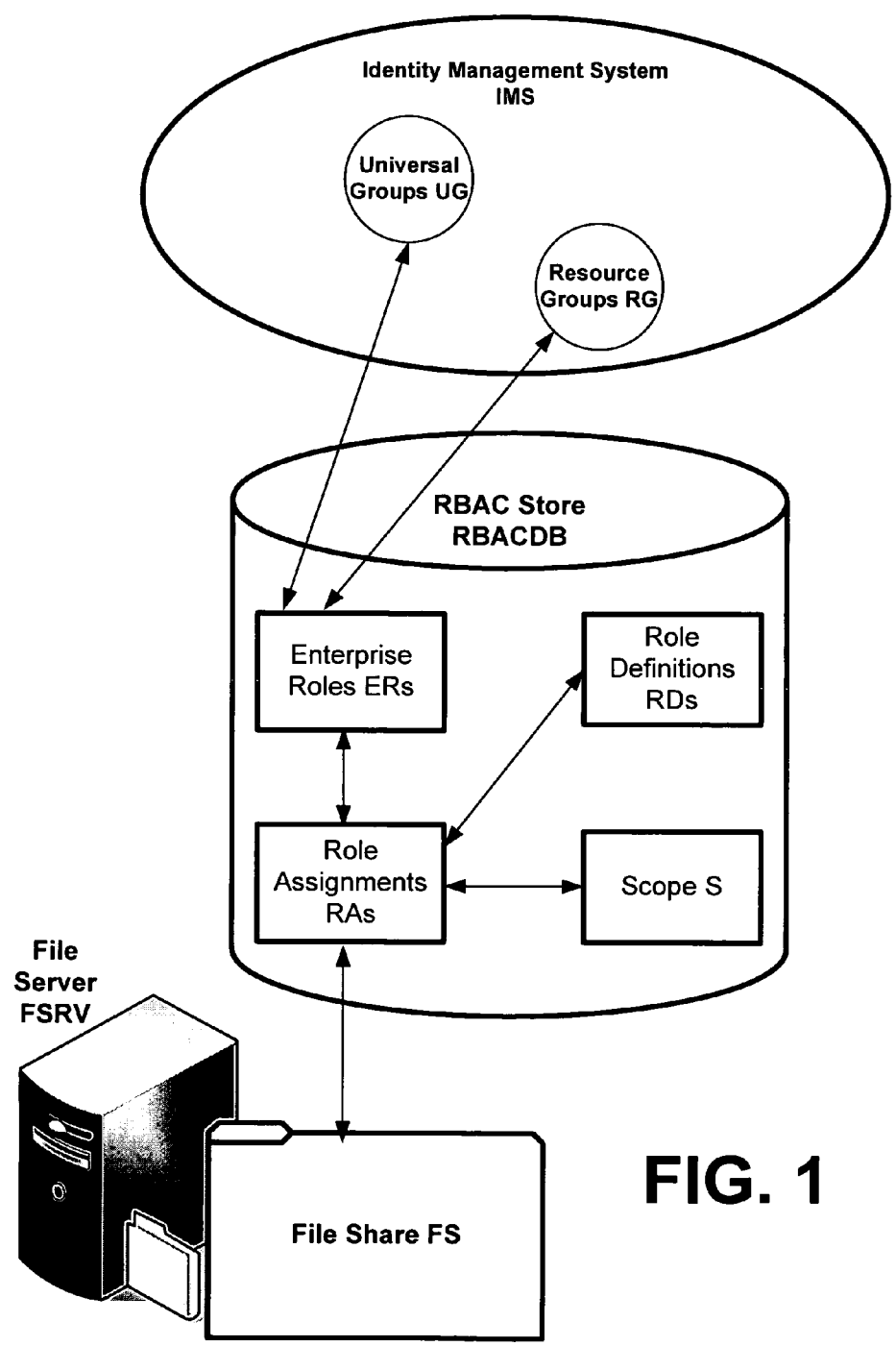
FIG. 1 is a block diagram of an overview of the RBAC system defined in accordance with the invention.

RBAC is an emergent solution for centralized authorization across an organization. RBAC enables activities that are difficult in the distributed ACL models on most computer systems. Such activities include authorization queries across applications. In consideration of the difficulties of accommodating complex ACL implementations relative to the advantages of RBAC policy systems, the invention provides a role-based authoring model for managing RBAC "roles" that can then be translated to ACL-based applications and other authorization enforcement mechanisms. To achieve this, the invention defines a new, generic RBAC system, e.g., based on existing RBAC conceptual models.

Thus, in one aspect of the invention, the invention provides a RBAC model that is compatible with resource authorization policy structures, such as ACLs, so that a translation can be performed between role-based data structures to ACLs. This includes the ability to map the RBAC policy to ACL-based permissions.

In various other non-limiting aspects of the invention, methods for implementing RBAC policy using membership groups are provided. Furthermore, various non-limiting embodiments of the role-based authoring tool of the invention include the ability to create a system level definition for distributed role-based authorization of computer resources.

In one exemplary, non-limiting Windows implementation of the invention, the RBAC policy to ACL translating capabilities of the invention provide "Roles-to-ACLs" translation with Windows Authorization Manager (WAM). In such implementation, WAM is utilized as a storage mechanism and object model to manage object types and relationships that an RBAC system uses, which can be translated to ACL data structures in accordance with resource authorization policy. Additionally, while the invention can be applied to a wide variety of computer systems, in one exemplary, non-limiting embodiment, the Windows NTFS file system is used as an exemplary resource manager.

The systems and methods for translating RBAC policy to resource authorization policy (RAP) are described in various non-limiting embodiments below. However, one of ordinary skill in the art can appreciate upon review of the various embodiments described herein, that the translation from RBAC policy models to RAP models in accordance with the invention may be practiced across a variety of RBAC policy models, now existing or designed in the future, or with the RBAC policy model defined in accordance with the invention. Likewise, one can appreciate that RBAC policy may be translated to a variety of RAP models, i.e., any model which grants privileges or authorization on a per resource, per application, or per service data structures and analysis, now existing or designed in the future, and thus the invention is not limited to RAP in accordance with the ACL based models and embodiments described herein.

Nomenclature

Finally, with respect to nomenclature, in addition to considering the context of how the terms are used, for the avoidance of doubt, the following RBAC terms should be understood to mean the following:

Scope—A set of resources;

Access Control List (ACL)—Access control policy on a computer resource;

Role-definition (or application role)—A set of permissions that can be assigned to principals in a given scope;

Role-assignment—An assignment of a role-definition one or more principals in a given scope;

Organizational Role (or role-group)—A set of people that have the same permissions on a given set of resources (scope);

Organizational Group—A security group type native to the authorization enforcement model of a given computer resource; and Resource Group—A security group type native to the authorization enforcement model of a given computer resource that is used to give members in the group specific access to specific resources.

Defining RBAC Policy and Translating RBAC Policy to Resource Authorization Policy As mentioned in the background, in general, RBAC modeling provides time, computing and complexity savings over distributed access control list (ACL) models, and are conceptually easier to author because they map to existing organizational notions. Yet, there is no way to translate role-based authoring models for managing RBAC "roles" to resource authorization policy (RAP), such as ACL-based applications.

In consideration of these and other problems of the state of the art, at a high level, the RBAC system of the invention advantageously provides centralized administration of authorization permissions computer resources based on organizational roles and allows for queries on user role memberships and capabilities, and allows translation of the role based structures to resource authorization structures, such as ACLs.

Accordingly, as shown in FIG. 1, the invention provides a RBAC system that includes a RBAC centralized storage model RBAC_DB. A main attribute of the centralized store RBAC_DB is that all the policy definition of the invention may be stored there. The policy need not necessarily be defined by a centralized presiding administrator (a delegation of administration model may exist). Moreover, policy need not necessarily be authored at the central store. A distributed implementation may distribute authoring to other policy stores though the policy will eventually be synchronized with the central store. In the RBAC system of FIG. 1, application permissions of an application resource authorization policy are defined and are mapped to application roles, or vice versa. As shown, set(s) of resources, e.g., File Share FS of File Server FSRV, are defined as scope(s) S and Organizational (or "Enterprise") Roles ERs are defined in terms of the resource groups RGs and universal user groups UGs in the role definitions RDs and the scopes S and permissions (role assignments RAs) given to the enterprise roles ERs. From the definition of the enterprise roles ERs based on role definitions RDs, Scope(s) S, and Role Assignments RAs, the RBAC system can create the groups UGs and RGs of an identity management system IMS, such as, but not limited to Active Directory groups and can configure the resource policy, such as ACLs, as needed.

Figure 2:
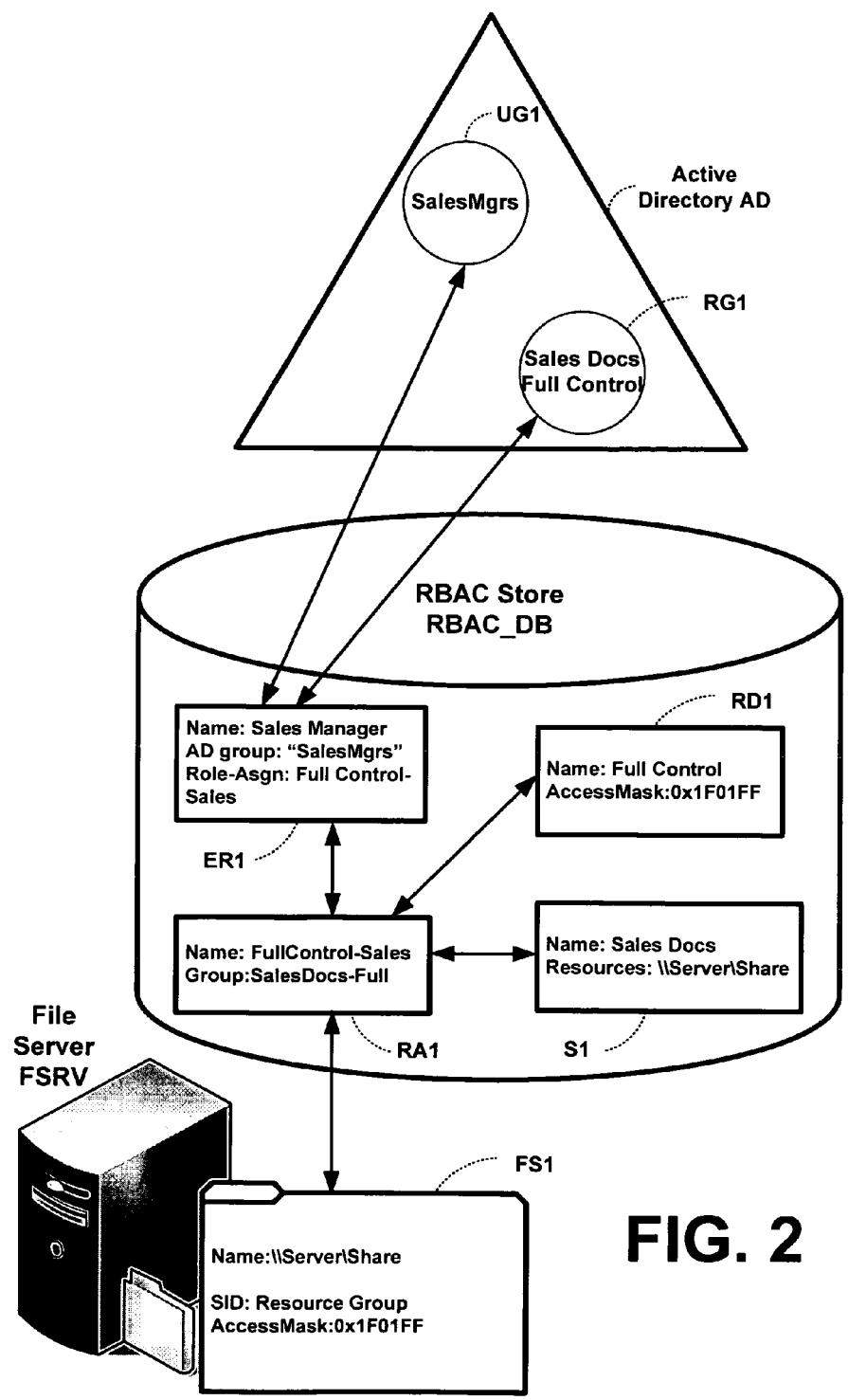
FIG. 2 is a block diagram of an example creation of a role for an RBAC system defined in accordance with the invention.

FIG. 2 illustrates an example of the RBAC centralized storage model RBAC_DB as applied to an example where a file share application or resource FS1 of file server FSRV is defined as a scope S1. In this example, the set of resources FS1 is named \\Server\Share, having security identifier (SID) and AccessMask:0x1F01FF is defined as scope S1 with name Sales Docs for resources at \\Server\Share. A corresponding Enterprise Role ER1 is then defined in terms of the resource groups and universal user groups in the role definition RD1 and the scope S1 and role assignment RA given to the enterprise roles ER1. Advantageously, from the definition of the enterprise role ER1 based on role definition RD1, Scope S1, and Role Assignment RA1, the RBAC system can create the groups UG1 and RG1 of an identity management system IMS, such as, but not limited to Active Directory groups UG1 and RG1 of Active Directory AD. The invention can thus be utilized to configure the resource policy, such as ACLs, as needed, through the lens of organizational roles of the RBAC system of the invention.

Figure 3:
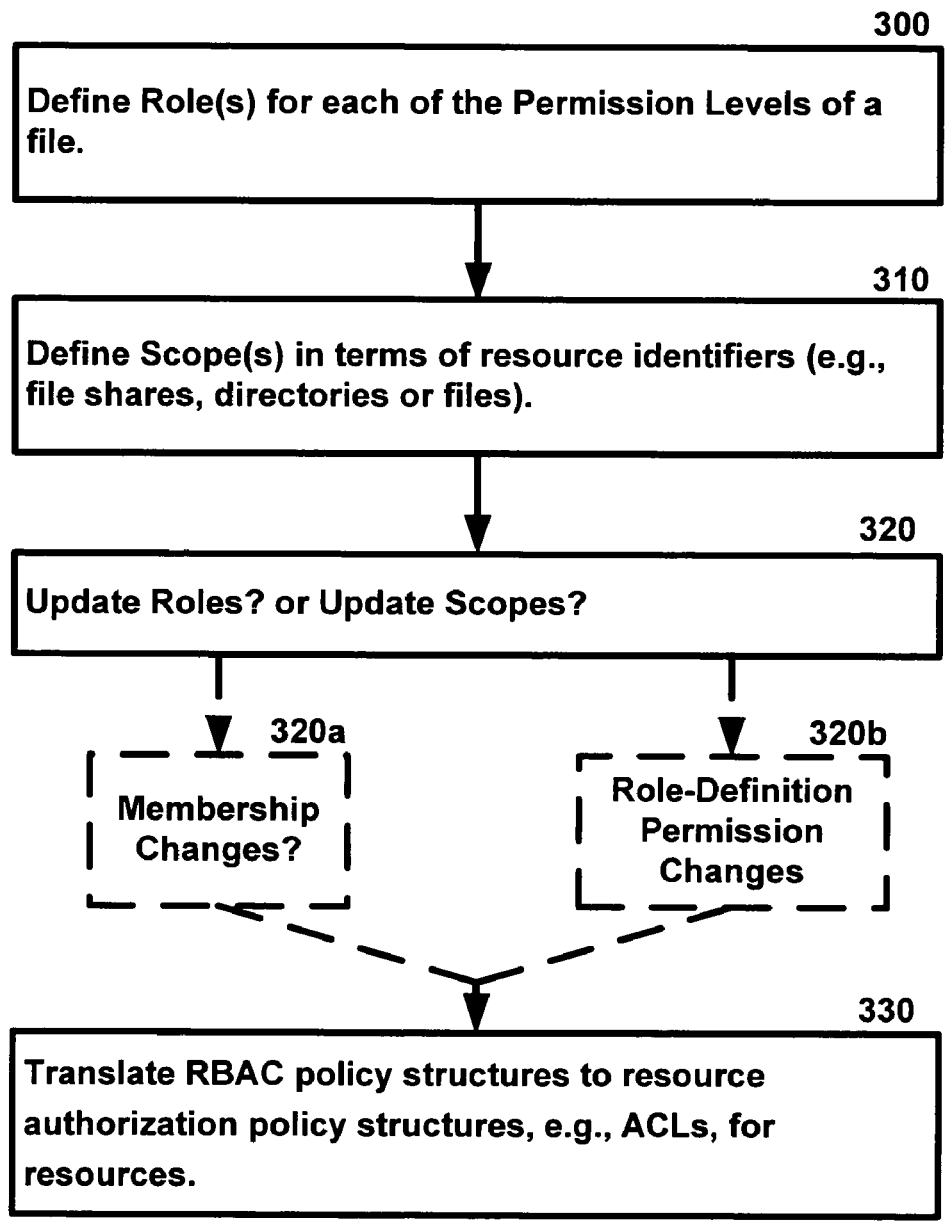
FIG. 3 is an exemplary flow diagram showing the creation of RBAC policy, the updating of RBAC policy, and translation to RAP structures in accordance with the invention.

FIG. 3 illustrates an exemplary, non-limiting flow diagram of the RBAC policy structures of the invention, as translated to resource authorization policy data structures in accordance with a file system embodiment of the invention (i.e., where the file system contains the requested resources). At 300, role(s) are defined for each of the permission levels of a file for the file system (custom levels are possible). At 310, scope(s) are defined in terms of resource identifiers (e.g., files shares, directories or files). At 320, the role(s) or the scope(s) may be updated according to the most current data. This may include updating membership groups as they change at 320a and may include role-definition permission changes as organizational authorization levels evolve at 320b. Then, at 330, these structures can be mapped to underlying ACLs that are set for the resources (i.e., file system ACLs). While FIG. 3 is described in the context of a file system resource, the concepts can be extended to the authorization of requests for any kind of resource, application or service in a networked computing environment.

Application Integration

Figure 4:
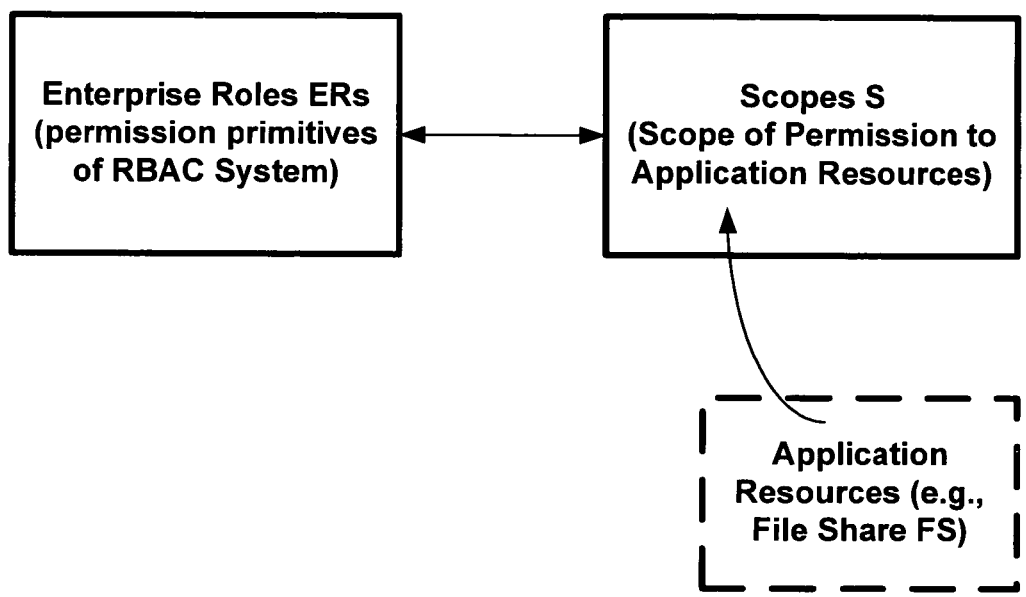
FIG. 4 is a block diagram showing the interrelationships of enterprise roles and scopes based on application resources in accordance with the RBAC policy definition of the invention.

As shown in FIG. 4, in accordance with the RBAC model and store 400 of the invention, for a particular application, the permission primitives are first defined within the RBAC system in terms of roles, i.e., Enterprise Roles ERs. Application resources, such as file share FS, are then added to the RBAC system through scopes S. Enterprise Roles ERs are then permitted access within scopes S according to role assignments and role definitions associated with Enterprise Roles ERs.

Application Role Definitions

To allow permission management and queries to be done centrally, the permissions for each application type are also entered into the RBAC system. This is done in terms of application roles defined as permission sets corresponding to a role in an application. For a non limiting example using the Windows file system, the invention defines a role for each of the current file system Explorer UI permission levels in terms of the operations (e.g., as available on the advanced ACL editor UI): Full Control, Modify, Read & Execute, Read and Write. It can be appreciated that a custom set of permissions, other than the Windows file system permission levels, can be defined as an application role-definition as well.

Resource Scope Definition

For each set of resources to be assigned to roles, a scope in accordance with the invention is defined in terms of resource identifiers. In the file system example, the resources are fileshares, directories or files. The resource identifiers can be the full path name to the resource. A scope can also be defined more broadly including resources spanning multiple servers. In the Windows file system example, for instance, such a scope can be defined in terms of a comma delimited list of the user principal names (UPNs) of file shares.

The name of a scope can be based on the path to a physical container containing the scopes resources. In the file system example of FIG. 2, as mentioned, such a scope name could be: "\\Server\share", which could be declared more granularly to a file such as \\folder\file if necessary. The scope name may also be any name that sufficiently describes the resources, such as "Sales Docs," which may be more useful for a scope spanning multiple document shares on servers in a sales organization, i.e., such a name may better map to the organizational structure and operational characteristics.

The example of FIG. 2 uses a scope that contains a single file share FS1. That scope name is used to prefix a "resource group" that is then used to populate each role. If more than one file share or directory is being used, then the list of file shares, files, or directories defining the scope could be maintained in the scope object S1.

For each set of resources (scope), the administrator of the resources enables the RBAC system to manage permissions by setting the actual resource permissions to allow the trusted authorization service account to update its permissions. In an exemplary embodiment of the invention, if the scope applies to a file share or directory with all of its resources (files and directories) in and below a specified file share or directory, then such file shares or directories are set to inherit permissions of the specified file share or directory by default.

Role-To-ACL Translation

The following actions are preformed by the RBAC to ACL translation system running on a domain controller or domain server in the trusted authorization service account defined above: Scope Creation, Organizational Role Creation and Policy Update including Membership Changes and Role-Definition Permission Changes. Various non-limiting implementation specific details are interweaved into the exemplary embodiments described below, however, it can be appreciated that the invention can be applied independently of computing platforms or any particular resource authorization policy model.

Scope Creation

When a new scope is created, the RBAC system of the invention creates a user group for each role-definition in the application. Thus, in the Windows file system example, the RBAC system creates a group for each of the application role definitions: Full Control, Modify, Read & Execute, Read and Write. These groups are granted permissions on the computer resources and therefore are a security group supported by the authorization enforcement model native to the computer resource. For example, in a Windows system, these groups can be Active Directory domain-local groups. These groups have names that describe scope and permission, such as "Scope1-full-control". These groups define the permissions for the organizational roles (traditionally these groups are called resource groups.) For each role definition to resource group relationship, the RBAC system of the invention creates a role assignment object in the RBAC system's data store. This allows a scope based application role membership query, which returns the members of the resource group. Organizational Roles are then assigned permissions to the scope through membership in these groups.

The following describes exemplary non-limiting optimizations for a Windows implementation of the invention. In such an implementation, the resources within a scope are (ideally) all in one domain and an Active Directory (AD) Domain Local Group suffices for such purpose. Domain-local groups are preferable, although not mandatory, because they are only added to a user's token when the user logs on to a server in that domain and not when logging on to another domain. This prevents SIDs from being added to the logon token, which would thereby slow down logon time when the SIDs are not needed.

Also, in such an implementation, it is preferable not to create resource groups until organizational roles have been assigned the corresponding role-definition in the scope. After creating the groups, the RBAC system of the invention calls the appropriate authorization management API (e.g., in Windows, this would be NTMarta or MACLs) to grant the group the appropriate permissions on the resources in the scope. For the file system example, an Access Control Entry (ACE) is then added, e.g., to the resources in the scope, for each resource group (Full Control, Modify, etc.). The permissions, e.g., the access mask, given to each group are then retrieved from the AccessMask property of each role definition corresponding to the resource group.

In another exemplary, non-limiting optimization of a Windows implementation of the invention, Security Descriptor Definition Language (SDDL) representations of the security descriptor are stored with their corresponding role-definitions.

Organizational Role Creation

To support bi-directional queries from roles to resource scopes and permissions, as mentioned, each organizational role is defined in the RBAC system. For each organizational role, the RBAC system of the invention creates an "organizational group" in the organization's identity management system (e.g., an Active Directory Universal Group) and an organizational Role object in RBAC system store. The organizational group includes the members of the organizational role and is linked to the organizational role object in the RBAC system.

While the organizational group must be a security group supported by the authorization enforcement model native to the computer resource, the membership of the group may be managed separately in any systems' membership objects. Examples of such memberships include but are not limited to domain security groups and email distribution lists. The RBAC system of the invention can synchronize such membership lists with security groups required.

In an optional aspect of the invention, the RBAC system can be extended beyond the main concept by allowing business logic to be captured in operating system (OS) access control list (ACL) primitives, but also, the invention can be extended to email groups, e.g., Distribution Lists (DLs).

When a new role is created in the RBAC system of the invention, the new role is assigned permissions in terms of the Role-definitions, as defined above, e.g., by the administrator who created the role. In the RBAC system, the organizational role is assigned an application role to a scope via the role assignment object relating the specified role definition and the scope.

For each Role-Assignment to the organizational role, the RBAC system of the invention assigns the organization group to the resource group matching the specified scope and role-definition, thereby granting users in the role the permissions defined in the role definition.

Policy Update

The RBAC system of the invention supports the ability to make policy updates including, but not limited to, changing the memberships or the permissions of the roles, described as follows.

Membership Changes

The RBAC system of the invention supports membership changes to organizational roles, which are stored in the organizational group, i.e., in the organization's identity management system, corresponding to the organizational role. An implementation of the RBAC system can optionally abstract the underlying groups or choose to expose the organizational group as a role.

Role-Definition Permission Changes

When permissions are changed for a role in a scope, the administrator typically does so by adding or removing application roles assigned to the organizational roles. In this case, the RBAC system of the invention either adds or removes the organizational group to or from the resource group corresponding to the application role-definition being added or removed from the role.

If an application role definition is being added or deleted, then a corresponding resource group needs to be created or deleted as described above (e.g., see Resource Scope Definition). If an application role definition is being changed, the permissions for the computer resources are then updated to give the updated set of resource groups the appropriate permissions on the computer resources (as discussed in the scope creation section above).

Figure 5:
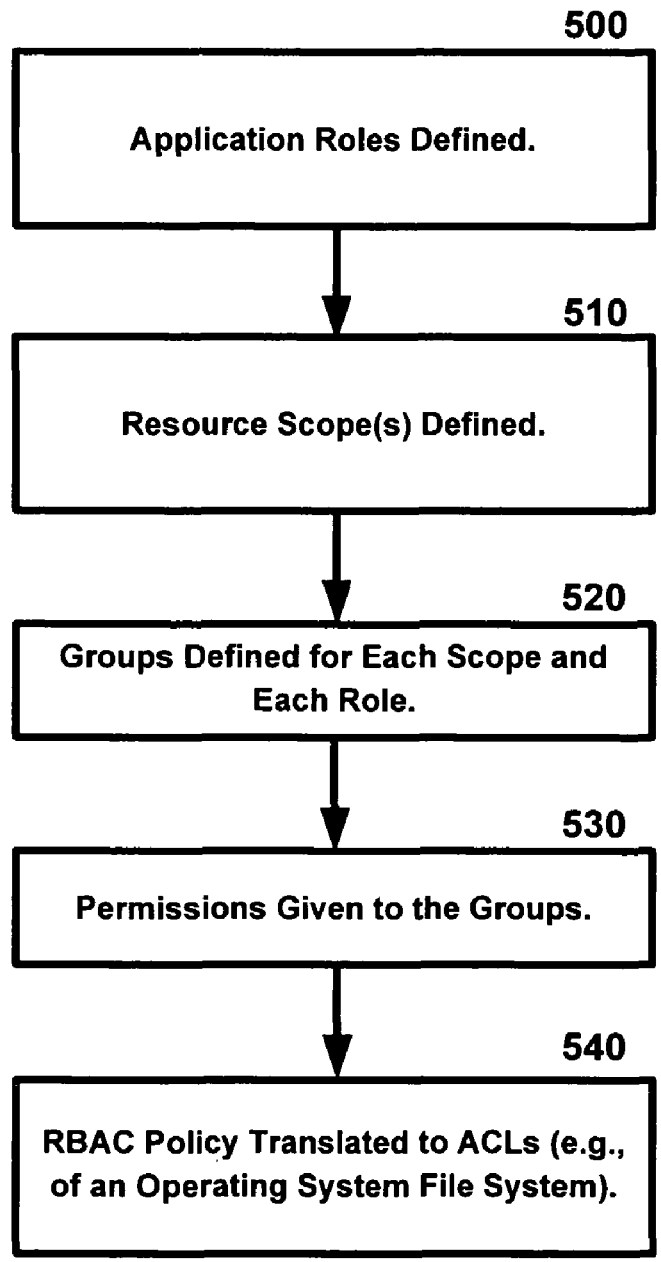
FIG. 5 is an exemplary, non-limiting flow diagram of the creation of RBAC policy in accordance with the invention, and corresponding automatic translation to access control lists (ACLs) in accordance with the invention.

Exemplary implementations of the invention operate according to the flow diagram of FIG. 5 in accordance with the detailed steps described above. At 500, application roles for the RBAC system of the invention are defined. At 510, resource scope(s) are defined in accordance with the RBAC system of the invention. At 520, groups are defined for each scope and each role. At 530, permissions are given to the groups created. At 540, the RBAC policy so defined according to 500 to 530 can be mapped to ACLs within the system for the purpose of performing underlying resource authorization policy, e.g., to directories, folders, etc. of a file system.

Exemplary Non-Limiting AzMan Implementation

The following describes an exemplary, non-limiting implementation of the invention using Windows Authorization Manager (AzMan) as a RBAC system store. Windows Server's AzMan provides infrastructure for the administration of role-based security, making it more scalable, flexible, and easier to implement. Using AzMan, roles can be defined as well as the tasks those roles can perform. Roles can be nested to inherit characteristics from other roles, and application groups can be defined. In addition, AzMan enables the use of scripts to modify permissions dynamically, and allows security logic to be wrapped into security policy that can be stored in Active Directory. AzMan also includes an easy-to-use API for running access checks.

In this regard, AzMan provides a similar RBAC conceptual model as to the one described in accordance with the invention above and also provides storage mechanisms and administrative interfaces. Thus, the AzMan framework can be leveraged to provide a Roles-to-ACL implementation that translates role based policy structures to ACL based policy structures. In doing so, the concepts used in the RBAC system are implemented with the following exemplary, non-limiting mappings:

Organizational Role (or role-group)—An AzMan application group object.
Scope—An AzMan Scope object
Role-definition—(or application role)—An AzMan Role-Definition object
Role-assignment—An AzMan Role Assignment object
Note: AzMan Application groups can be statically defined or computed at runtime.

With respect to setup for the presently described AzMan implementation, an Active Directory (AD) account is created which is then used by a trusted authorization service to update role memberships in AD and ACLs on resources. This AD account then logs on to each resource server in order to update the ACLs on resources. Then, an AzMan store object is created and the trusted authorization service is assigned to the Policy Reader AzMan administrative role.

With respect to application initialization in the Azman implementation, an application is defined in AzMan for the NTFS resource manager. The NTFS operations are mapped to AzMan operations. To simplify the process of conversion to access mask, each permission may be made equal in number to the corresponding access mask. An AzMan role-definition is defined for each permission level in the NTFS ACL Editor (Full Control, Modify, etc.) and a corresponding access mask is stored in the ApplicationData property on the role-definition object.

With respect to scope creation in the Azman implementation, for each scope, an AzMan scope is defined in the NTFS AzMan application. The list of file shares and directory UNCs in the scope can be kept in the AzMan scope object's ApplicaitonData property.

With respect to organizational role creation in the Azman implementation, for each organizational role, an AzMan global application group is created. The AD universal group is assigned to the AzMan global application group. For each application role to which the organizational role is assigned, the RBAC system creates an AzMan Role-Assignment object, which links to an application defined role definition (i.e., Full Control, Modify, etc.).

For each AzMan role assignment, the RBAC system assigns the AD universal group to the resource groups defined above by enumerating the list of organizational roles in AzMan, i.e., the AzMan global application groups, and also for each role enumerating the RoleAssignments. Each RoleAssignment identifies a scope and a role definition. The RBAC system then assigns the AD universal group, identified as a member to the AzMan application group in the presently described implementation, to the resource group matching the scope and role-definition identified by each role assignment object.

With respect to membership changes in the AzMan implementation, membership changes to organizational roles are stored in the AD universal group corresponding to the organizational role. The RBAC system abstracts this or exposes the AD group and the AzMan application group contains at least one of the AD universal groups.

With respect to permission changes in the AzMan implementation, permission changes are managed as they are above, with the additional task adding or removing the assignment of the AzMan global group to the AzMan role assignments and adding, deleting, or updating the AzMan role definitions when organizational role permissions are added, deleted or changed.

Supplemental Context—ACL-Based Systems

An access control list (ACL) is a data structure, such as a table, that tells a computer system which access rights each user has to a particular system object, such as a file directory or individual file. Each object has a security attribute that identifies its access control list. The list has an entry for each system user with access privileges or explicit denial of access privileges. The most common privileges include the ability to read a file (or all the files in a directory), to write to the file or files, and to execute the file (if it is an executable file, or program). A variety of operating systems use access control lists, implemented differently by each operating system.

In Windows, generally, an access control list (ACL) is associated with each system object. Each ACL has one or more access control entries (ACEs) consisting of the name of a user or group of users. The user can also be a role name, such as "programmer," or "tester." For each of these users, groups, or roles, the access privileges are stated in a string of bits called an access mask. Generally, the system administrator or the object owner creates the access control list for an object.

Figure 6:
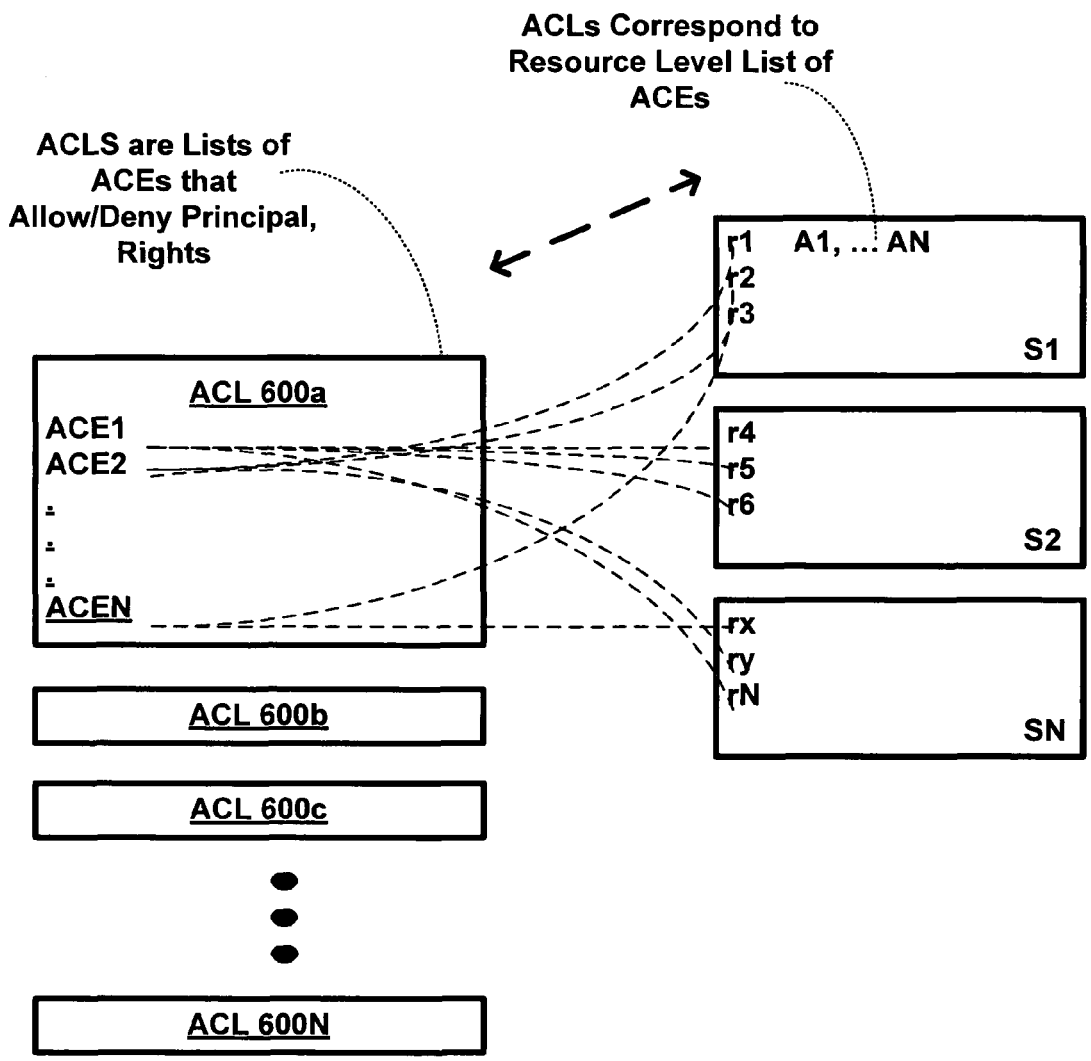
FIG. 6 is an exemplary block diagram showing the per resource application of access control entries (ACEs) in an authorization system using ACLs.

As reflected by FIG. 6, ACLs 600a, 600b, 600c, . . . , 600N include one or more access control entries (ACEs). For instance, ACL 600a includes ACE1, ACE2, . . . , ACEN. ACLs are lists of ACEs that allow/deny a principal certain rights. Each of the ACEs of the ACLs can be mapped per resource, such that each resource has a list of ACEs from the ACLs that apply to that resource. For instance, as shown, ACE1, ACE2 and ACEN of ACL 600a are mapped to the various resources of the subcomponents S1, S2, . . . , SN of the computing system. For instance, subcomponent S1 might be a first server, and S2 might be a second server, and so on. Resources r1, r2, r3 are associated with subcomponent S1, resources r4, r5, r6 are associated with subcomponent S2 and resources rx, ry, rN are associated with subcomponent SN. However resources might be sub-grouped within the system, the ACEs of the ACLs can be mapped to the individual resources of the computing system as shown by the dotted lines translating from ACLs to resource based policy based on the corresponding ACEs.

Supplemental Context—NIST RBAC Standard

As one non-limiting, exemplary RBAC policy model, the National Institute for Standards Technology (NIST) has an RBAC standard (i.e., InterNational Committee for Information Technology Standards (INCITS) Designation: INCITS 359), for which an overview is provided as follows. The NIST standard includes a reference model defining some commonly accepted RBAC features and functional specifications for the RBAC features defined in the reference model. The NIST standard consists of two main parts—the RBAC Reference Model and the RBAC System and Administrative Functional Specification, which are described in more detail below.

The RBAC Reference Model defines sets of basic RBAC elements (i.e., users, roles, permissions, operations and objects) and relations as types and functions that are included in this standard. The RBAC reference model serves two purposes. First, the reference model defines the scope of RBAC features that are included in the standard. This identifies the minimum set of features included in all compliant RBAC systems, aspects of role hierarchies, aspects of static constraint relations, and aspects of dynamic constraint relations. Second, the reference model provides a language, in terms of element sets and functions, for use in defining the functional specification.

The RBAC System and Administrative Functional Specification specifies the features that are required of an RBAC system. These features fall into three categories, administrative operations, administrative reviews, and system level functionality. The administrative operations define functions in terms of an administrative interface and an associated set of semantics that provide the capability to create, delete and maintain RBAC elements and relations (e.g., to create and delete user role assignments). The administrative review features define functions in terms of an administrative interface and an associated set of semantics that provide the capability to perform query operations on RBAC elements and relations. System level functionality defines features for the creation of user sessions to include role activation/deactivation, the enforcement of constraints on role activation, and for calculation of an access decision.

The RBAC reference model is defined in terms of four model components—Core RBAC, Hierarchical RBAC, Static Separation of Duty Relations, and Dynamic Separation of Duty Relations. Each model component is defined by the following sub-components: a set of basic element sets, a set of RBAC relations involving those element sets (containing subsets of Cartesian products denoting valid assignments) and a set of Mapping Functions, which yield instances of members from one element, set for a given instance from another element set.

Core RBAC defines a minimum collection of RBAC elements, element sets, and relations in order to completely achieve a Role-Based Access Control system. This includes user-role assignment and permission-role assignment relations, considered fundamental in any RBAC system. In addition, Core RBAC introduces the concept of role activation as part of a user's session within a computer system. Core RBAC is required in any NIST compliant RBAC system, but the other components are independent of each other and may be implemented separately. The RBAC model as a whole is fundamentally defined in terms of individual users being assigned to roles and permissions being assigned to roles. As such, a role is a means for naming many-to-many relationships among individual users and permissions. In addition, the core RBAC model includes a set of sessions (SESSIONS) where each session is a mapping between a user and an activated subset of roles that are assigned to the user.

Core RBAC includes sets of five basic data elements called users (USERS), roles (ROLES), objects (OBS), operations (OPS), and permissions (PRMS). A user generally refers to a human being, but as a concept, the notion of a user and a user's credentials can be extended to include machines, networks, or intelligent autonomous agents that act on behalf of human beings in some fashion. A role is a job function within the context of an organization with some associated semantics regarding the authority and responsibility conferred on the user assigned to the role. Permission is an approval to perform an operation on one or more RBAC protected objects. An operation is an executable image of a program, which upon invocation executes some function for the user. The types of operations and objects that RBAC controls are dependent on the type of system in which it will be implemented. For example, within a file system, operations might include read, write, and execute; within a database management system, operations might include insert, delete, append and update. The purpose of any access control mechanism is to protect system resources (i.e., protected objects). Consistent with earlier models of access control an object is an entity that contains or receives information.

Each session is a mapping of one user to possibly many roles, i.e., a user establishes a session during which the user activates some subset of roles that he or she is assigned. Each session is associated with a single user and each user is associated with one or more sessions. The function session_roles gives us the roles activated by the session and the function session_users gives us the user that is associated with a session. The permissions available to the user are the permissions assigned to the roles that are currently active across all the user's sessions.

The Hierarchical RBAC component adds relations for supporting role hierarchies. A hierarchy is mathematically a partial order defining a seniority relation between roles, whereby senor roles acquire the permissions of their juniors and junior roles acquire users of their seniors. In addition, Hierarchical RBAC goes beyond simple user and permission role assignment by introducing the concept of a role's set of authorized users and authorized permissions.

Hierarchies are a natural means of structuring roles to reflect an organization's lines of authority and responsibility. Role hierarchies define an inheritance relation among roles. Inheritance has been described in terms of permissions; i.e., r1 "inherits" role r2 if all privileges of r2 are also privileges of r1. For some distributed RBAC implementations, role permissions are not managed centrally, while the role hierarchies are. For these, role hierarchies are managed in terms of user containment relations: role r1 "contains" role r2 if all users authorized for r1 are also authorized for r2. Note, however, that user containment implies that a user of r1 has (at least) all the privileges of r2, while the permission inheritance for r1 and r2 does not imply anything about user assignment.

This standard recognizes two types of role hierarchies—general role hierarchies and limited role hierarchies. General role hierarchies provide support for an arbitrary partial order to serve as the role hierarchy, to include the concept of multiple inheritances of permissions and user membership among roles. Limited role hierarchies impose restrictions resulting in a simpler tree structure (i.e., a role may have one or more immediate ascendants, but is restricted to a single immediate descendent).

General role hierarchies support the concept of multiple inheritance, which provides the ability to inherit permission from two or more role sources and to inherit user membership from two or more role sources.

A third model component, Static Separation of Duty (SSD) Relations, adds exclusivity relations among roles with respect to user assignments. Conflict of interest in a role-based system may arise as a result of a user gaining authorization for permissions associated with conflicting roles. One means of preventing this form of conflict of interest is through SSD, that is, to enforce constraints on the assignment of users to roles. Because of the potential for inconsistencies with respect to static separation of duty relations and inheritance relations of a role hierarchy, the SSD relations model component defines relations in both the presence and absence of role hierarchies. Static constraints can take on a wide variety of forms. A common example is an SSD that defines mutually disjoint user assignments with respect to sets of roles.

The fourth model component, Dynamic Separation of Duty (DSD) Relations, defines exclusivity relations with respect to roles that are activated as part of a user's session and provides the capability to enforce an organization specific policy of DSD.

Comparing SSDs and DSDs, SSD relations define and place constraints on a user's total permission space. SSD relations reduce the number of potential permissions that can be made available to a user by placing constraints on the users that can be assigned to a set of roles. DSD relations, like SSD relations, are intended to limit the permissions that are available to a user. However, DSD relations differ from SSD relations by the context in which these limitations are imposed. The DSD Relations model component defines DSD properties that limit the availability of the permissions over a user's permission space by placing constraints on the roles that can be activated within or across a user's sessions. DSD properties provide extended support for the principle of least privilege in that each user has different levels of permission at different times, depending on the role being performed. These properties ensure that permissions do not persist beyond the time that they are required for performance of duty. This aspect of least privilege is often referred to as timely revocation of trust. Other differences between SSDs and DSDs exist as well, and as can be appreciated, dynamic revocation of permissions can be a rather complex issue without the facilities of dynamic separation of duty, and as such it has been generally ignored in the past for reasons of expediency.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for translating across access policy models in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for performing translation across access policy models of the invention.

Figure 7A:
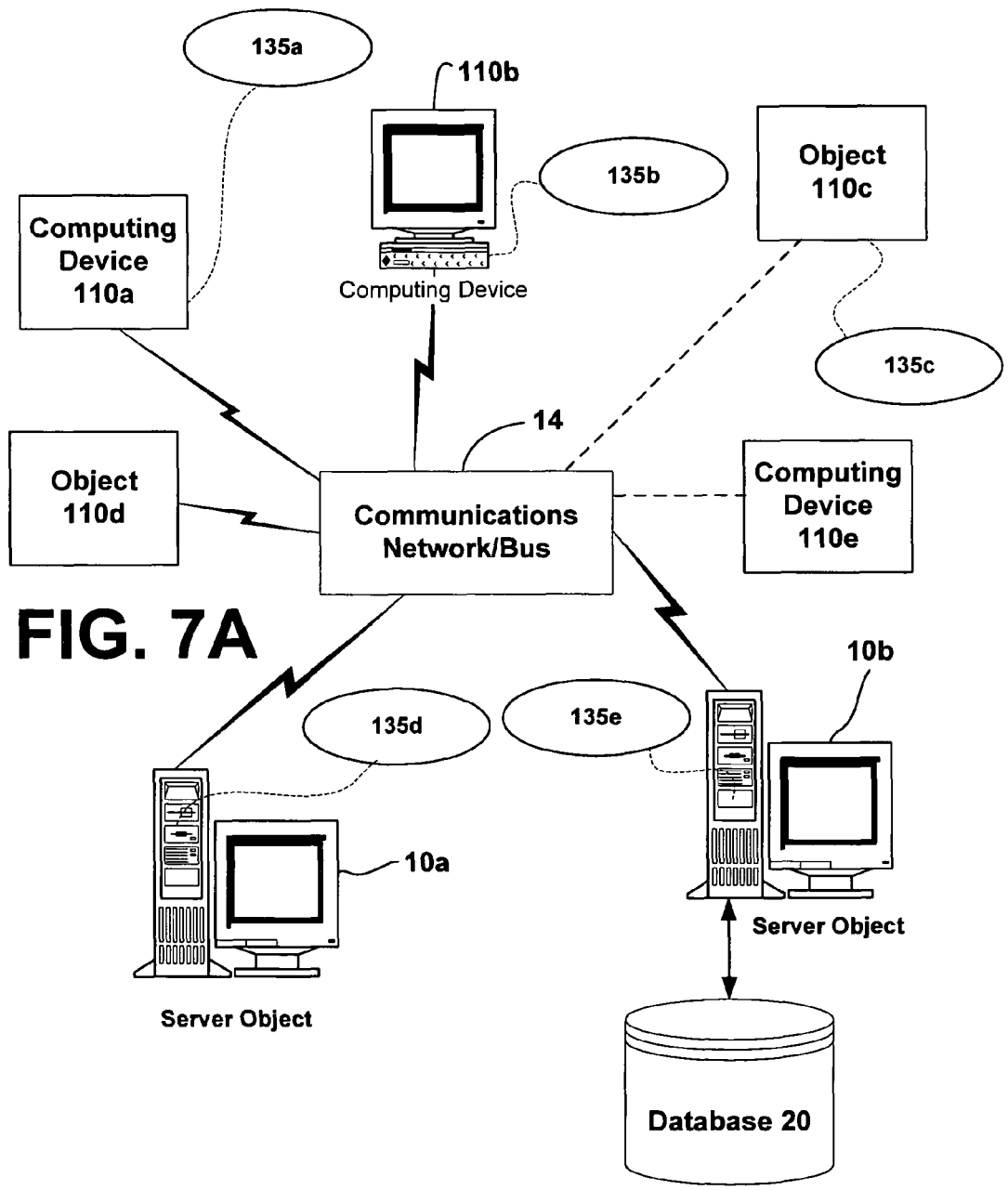
FIG. 7A is a block diagram representing an exemplary network environment in which the present invention may be implemented.

FIG. 7A provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 7A, and may itself represent multiple interconnected networks. In accordance with an aspect of the invention, each object 10*a*, 10*b*, etc. or 110*a*, 110*b*, 110*c*, etc. may contain an application that might make use of an API, or other object, software, firmware and/or hardware, suitable for use with the systems and methods for translating from RBAC policy models to RAP models in accordance with the invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to translating across access policy models according to the present invention.

In home networking environments, there are at least four disparate network transport media that may each support a unique protocol, such as Power line, data (both wireless and wired), voice (e.g., telephone) and entertainment media. Home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home, e.g., using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as a GSM network environment or the Internet. In short, a variety of disparate sources exist for the storage and transmission of data, and consequently, moving forward, computing devices will require ways of sharing data, such as data accessed or utilized incident to program objects, such during the translation across access policy models in accordance with the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 7A, as an example, computers 110*a*, 110*b*, etc. can be thought of as clients and computers 10*a*, 10*b*, etc. can be thought of as servers where servers 10*a*, 10*b*, etc. maintain the data that is then replicated to client computers 110*a*, 110*b*, etc., although any computer can be considered a client, a server, or both, depending on the circumstances. Any of these computing devices may be processing data or requesting services or tasks that may implicate the translation from RBAC to RAP models in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for translating across access policy models of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 7A illustrates an exemplary networked or distributed environment, with server(s) in communication with client computer (s) via a network/bus, in which the present invention may be employed. In more detail, a number of servers 10*a*, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to translate one access policy model to another.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 7B:
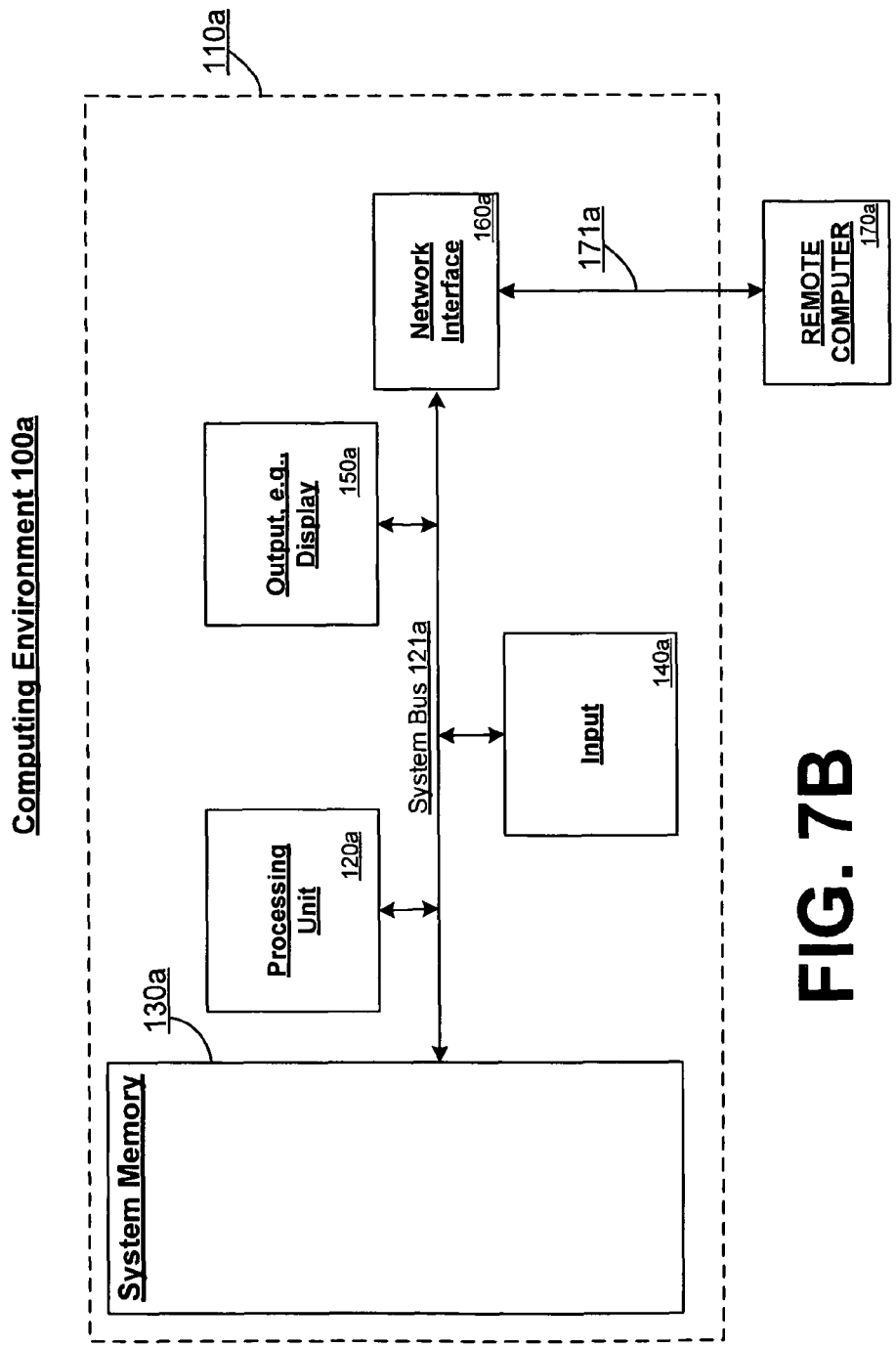
FIG. 7B is a block diagram representing an exemplary non-limiting computing system environment in which the present invention may be implemented.

As mentioned, the invention applies to any device wherein it may be desirable to translate across access policy models of a computing device. It should be understood, therefore, that handheld, portable and other computing devices and computing objects of all kinds are contemplated for use in connection with the present invention, i.e., anywhere that a device may wish to translate across policy models for access control (e.g., GSM network via a portable device such as a mobile phone). Accordingly, the below general purpose remote computer described below in FIG. 7B is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 7B thus illustrates an example of a suitable computing system environment 100a in which the invention may be implemented, although as made clear above, the computing system environment 100a is only one example of a suitable computing environment for a computing device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 7B, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

A user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have capabilities, such as media capabilities, different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 7B include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a network component (network card, modem, etc.) or other means for establishing communications over the WAN, such as the Internet. A means to connect to a network, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for translating across policy models in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for translating across policy models of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to translate one access policy model to another. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the methods for translating across policy models of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for translating across policy models. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method comprising:
   providing in a computer, a role based access control (RBAC) store, the RBAC store defining at least one scope wherein each scope represents a set of resources in a networked computing environment;
   providing in the RBAC store, at least one role definition and at least one role assignment;
   defining in the RBAC store, based at least in part on the at least one role definition and the at least one role assignment, at least one enterprise role, each enterprise role including a set of permissions that are assigned to principals in a given scope; and
   using the RBAC store for translating the at least one scope, the at least one enterprise role and at least one resource group representing a role based access control (RBAC) policy to a resource authorization policy model, the RBAC policy mappable to at least one access control list (ACL) in the networked computing environment for configuring an underlying resource authorization policy.

2. The method of claim 1, further comprising:
   granting or denying permissions to the at least one resource group based on the corresponding scope and enterprise role.

3. The method of claim 1, further comprising:
   translating the at least one scope, the at least one enterprise role and the at least one resource group to form translation information for translating to access control entry (ACE) data structures.

4. The method of claim 1, wherein the at least one resource group of principals comprises a pre-existing membership group associated with an organization operating in the networked computing environment.

5. The method of claim 4, further comprising:
   updating the at least one resource group when the pre-existing membership group changes.

6. The method of claim 5, wherein the at least one resource group of principals comprises an email group or a distribution list associated with the organization.

7. The method of claim 1, wherein a scope of the at least one scope is defined as one or more of a collection of files, folders or other objects as organized by an operating system's file system.

8. The method of claim 1, further comprising:
   updating the at least one scope when a set of resources associated with a scope changes.

9. An application programming interface comprising computer executable interface modules having computer executable instructions for performing the method of claim 1.

10. A computer readable storage medium that is not a transient signal, the computer readable storage medium configured to store instructions that, when executed, provide for:
    defining in a role based access control (RBAC) store, scope data representing at least one scope wherein each scope represents a set of resources in a networked computing environment;
    providing in the RBAC store, role definition data defining at least one role, each role including a set of permissions that are assigned to principals in a given scope; and
    using the RBAC store for translating the at least one scope and the at least one enterprise role representing a role based access control (RBAC) policy to a resource authorization policy model, the RBAC policy mappable to at least one access control list (ACL) in the networked computing environment for configuring an underlying resource authorization policy.

11. The computer readable storage medium according to claim 10, wherein the resource authorization policy addresses access control lists (ACEs) data structures.

12. The computer readable storage medium according to claim 10, further comprising:
    a computer executable module for authoring the RBAC store.

13. The computer readable storage medium according to claim 10, further comprising:

a computer executable module for translating the RBAC store to the data structures associated with the resource authorization policy.

14. The computer readable storage medium according to claim 10, further comprising:
a computer executable module for translating the RBAC store to the permissions associated with the resource authorization policy.

15. A computer readable storage medium that is not a transient signal, the computer readable storage medium configured for storing computer executable instructions that, when executed, provide an authoring tool for creating role based access control policy to be enforced in a networked computing environment including authorizations based on resource authorization policy, the authoring tool comprising:
means for defining in a role based access control (RBAC) store, at least one scope wherein each scope represents a set of resources in the networked computing environment;
means for providing in the RBAC store, at least one role definition, each including a set of permissions that are assigned to principals in a given scope; and
means for using the RBAC store for translating the at least one scope, the at least one application role and the at least one resource group representing the role based access control (RBAC) policy model for configuring at least one underlying access control list (ACL) in the networked computing environment.

16. The computer readable storage medium of claim 15, the authoring tool further comprising:
means for granting or denying permissions to the at least one resource group based on the corresponding scope and enterprise role.

17. The method of claim 1, wherein the set of resources is identifiable by a security identifier and an access mask, and further wherein at least one of the security identifier or the access mask is incorporated into at least one of the scope or the role definition provided in the RBAC store.

18. The method of claim 1, wherein the role definition is defined at least in part, by an access mask associated with the set of resources.

19. The method of claim 1, wherein each of the enterprise role, the role assignment, the role definition, the scope, and the set of resources includes respective names, the respective names used for defining relationships between two or more of the enterprise role, the role assignment, the role definition, the scope, and the set of resources.

20. The method of claim 1, wherein the RBAC store is operative to implement resource authorization policy between the set of resources and an identity management system, the identity management system comprising the at least one resource group.

* * * * *